(12) United States Patent
Lais et al.

(10) Patent No.: US 12,499,338 B2
(45) Date of Patent: Dec. 16, 2025

(54) CODE READING DEVICE AND METHOD FOR THE PARALLEL READING OF A PLURALITY OF CODES

(71) Applicant: SICK AG, Waldkirch (DE)

(72) Inventors: Stefan Lais, Waldkirch (DE); Carl Joseph Hafner, Waldkirch (DE); Manfred Pierl, Waldkirch (DE); Tobias Zimmermann, Waldkirch (DE); Jaroslaw Ermantraut, Waldkirch (DE)

(73) Assignee: SICK AG, Waldkirch (DE)

( * ) Notice: Subject to any disclaimer, the term of this patent is extended or adjusted under 35 U.S.C. 154(b) by 25 days.

(21) Appl. No.: 18/434,374

(22) Filed: Feb. 6, 2024

(65) Prior Publication Data
US 2024/0265220 A1 Aug. 8, 2024

(30) Foreign Application Priority Data
Feb. 7, 2023 (DE) .......................... 102023102950.9

(51) Int. Cl.
*G06K 7/14* (2006.01)
*G06K 7/10* (2006.01)
*G06T 3/4038* (2024.01)
*G06T 7/13* (2017.01)

(52) U.S. Cl.
CPC ....... *G06K 7/1443* (2013.01); *G06K 7/10861* (2013.01); *G06T 3/4038* (2013.01); *G06T 7/13* (2017.01); *G06T 2207/10152* (2013.01)

(58) Field of Classification Search
CPC ................................ G06K 7/1443; G06T 7/13

USPC ...................................................... 235/462.08
See application file for complete search history.

(56) References Cited

U.S. PATENT DOCUMENTS

| | | | |
|---|---|---|---|
| 6,778,683 B1 * | 8/2004 | Bonner | G06V 10/147 235/462.07 |
| 8,628,014 B1 * | 1/2014 | Hoffer, Jr. | G06K 7/10811 235/462.23 |
| 11,438,518 B1 * | 9/2022 | Barish | H04N 23/67 |
| 12,182,659 B1 * | 12/2024 | Can | G06K 7/1443 |
| 2012/0057022 A1 * | 3/2012 | Nechiporenko | G06V 10/147 348/135 |
| 2013/0020391 A1 | 1/2013 | Olmstead et al. | |
| 2014/0034731 A1 | 2/2014 | Gao et al. | |
| 2014/0034736 A1 * | 2/2014 | Jia | G06K 7/1447 235/462.25 |

(Continued)

FOREIGN PATENT DOCUMENTS

| | | |
|---|---|---|
| DE | 102018109392 A1 | 10/2019 |
| DE | 202019104044 U1 | 10/2019 |

(Continued)

*Primary Examiner* — Allyson N Trail
(74) *Attorney, Agent, or Firm* — Nath, Goldberg & Meyer; Jerald L. Meyer

(57) ABSTRACT

A code reading unit for the parallel reading of a plurality of codes on a plurality of objects in a conveying unit is provided, wherein the code reading device has a camera unit having at least one camera head for recording an image of the objects with the codes and a control and evaluation unit that is configured to localize code regions of the codes in the image and to read the code information of the codes and to determine the position of a respective code in the image and to associate the position of a code in the image with a position in the conveying unit.

20 Claims, 3 Drawing Sheets

(56) References Cited

U.S. PATENT DOCUMENTS

| | | | | |
|---|---|---|---|---|
| 2014/0132389 A1* | 5/2014 | Choi | ............... | G06K 7/146 340/5.1 |
| 2015/0194023 A1* | 7/2015 | Brackenridge | ........ | G06Q 30/06 235/383 |
| 2015/0307278 A1* | 10/2015 | Wickham | ............ | G06Q 10/087 700/216 |
| 2016/0104020 A1* | 4/2016 | Bachelder | ............ | G06K 7/1465 235/462.12 |
| 2016/0110633 A1* | 4/2016 | Moore | ................. | G06V 20/80 348/207.2 |
| 2020/0019743 A1* | 1/2020 | Lei | ....................... | G06K 7/1443 |
| 2020/0068126 A1* | 2/2020 | Fink | ..................... | G06K 7/1413 |
| 2022/0269251 A1* | 8/2022 | LaChappelle | ......... | B07C 5/3412 |
| 2022/0303445 A1* | 9/2022 | Skaff | ..................... | H04N 23/57 |
| 2022/0414916 A1* | 12/2022 | El-Barkouky | ............ | G06T 7/70 |
| 2023/0244891 A1* | 8/2023 | Ma | ................... | G06K 7/10722 235/462.09 |
| 2023/0316025 A1* | 10/2023 | Schüler | ................ | G06K 7/1417 235/462.1 |
| 2023/0394259 A1* | 12/2023 | Hampf | .................... | G06K 7/146 |
| 2024/0013139 A1* | 1/2024 | Levy | ....................... | G07F 17/10 |
| 2024/0059492 A1* | 2/2024 | Miura | .................... | G05D 1/646 |
| 2024/0070413 A1* | 2/2024 | He | ....................... | G06K 7/10722 |
| 2024/0070418 A1* | 2/2024 | Kuo | ..................... | G06F 3/04847 |
| 2024/0242045 A1* | 7/2024 | Ohori | ................. | G02B 27/0012 |
| 2024/0249095 A1* | 7/2024 | Lee | ..................... | G06K 7/10722 |
| 2024/0265219 A1* | 8/2024 | Müller | ................. | G06K 7/1417 |
| 2024/0265220 A1* | 8/2024 | Lais | .................... | G06T 3/4038 |
| 2025/0068871 A1* | 2/2025 | Garcia Morchon | . | G06K 7/1417 |

FOREIGN PATENT DOCUMENTS

| | | |
|---|---|---|
| DE | 102019134064 A1 | 6/2021 |
| EP | 3836001 B1 | 8/2022 |
| WO | 2019149908 A1 | 8/2019 |

* cited by examiner

CODE READING DEVICE AND METHOD FOR THE PARALLEL READING OF A PLURALITY OF CODES

FIELD

The invention relates to a code reading device and to a method for the parallel reading of a plurality of codes on a plurality of objects in a conveying unit respectively.

BACKGROUND

There are code applications in which a large number of optical codes or barcodes have to be read simultaneously. This is done, for example, in the pharmaceutical sector where the codes of a plurality of medicine packets are read that are accommodated together in a box. Similar problems result with cigarettes or inventory work in the logistics field. There are image based multicode readers for such applications that record a common image of a large number of objects with codes and read these codes.

DE 10 2019 134 064 A1 discloses a corresponding code reading device having a camera unit. A hand held reading unit is additionally provided there to first check unread codes. In this respect, evaluation mechanisms are implemented that simplify the localization of such initially unread codes and ensure that all the codes have been read in the end. The code reading device is moreover integrated in a superior system having a central database to confirm the authenticity of the code and to preclude falsifications.

A respective code here is, however, only associated with the total camera reading field or the box having the code bearing objects as such. A finer spatial or geometrical distinction within the box is not provided. It is here naturally known within the framework of decoding and localizing unread codes where the code is in the recorded image, but this is then not linked to the box and its geometry or substructure.

In other code reading applications, the objects are conveyed through the reading region on a conveyor belt, i.e. the reading of the code takes place successively instead of in parallel for a large number of codes. It is also known in this context to associate the codes with a respective code bearing object. This is described, for example, in US 2013/020391 A1. There is no box or the like here in which a spatial association would be possible at all.

DE 20 2019 104 044 U1 describes a system of verifying and logging out medication packaging with reference to individual serial numbers specific to the packaging. It is here a question of how the communication of the code information can take place, for example, between a hospital pharmacy and a third party provider of a verification database. The actual detection of the codes or the code reading is not looked at in any more detail. WO 2019/149908 A1 describes a method of monitoring the supply chain of a product. Different cryptographic methods, including a blockchain, are proposed for this purpose.

SUMMARY

It is therefore the object of the invention to further improve the parallel code reading.

This object is satisfied by a code reading device and by a method for the parallel reading of a plurality of codes on a plurality of objects in a conveying unit in accordance with the respective independent claim. The code reading device is configured for a parallel mass reading of also larger groups of objects with codes. The objects are located together in a conveying unit, for example in a box, on a pallet, or the like. As part of the mass reading, the codes that are present are read at once and objects with a respective code are not as otherwise often usual presented on a belt successively or conveyed successively through a reading field of a code reader.

A camera unit having at least one camera head records an image of the objects together with the codes. The camera unit detects the conveying unit from the relevant side where the codes can be recognized, in particular from a plan view. The box is packed for this purpose, for example, such that the top sides of the objects bearing a code face upward. A control and evaluation unit identifies the code regions in the image and reads the codes. It additionally determines the position of a respective code in the image.

The invention starts from the basic idea of including the arrangement of the objects with the codes in the conveying unit in the further processing. A position in the conveying unit is associated with the position of a code in the image. A code, and consequently, an object bearing the code, is thus in a geometrical relationship with the conveying unit. This can be understood as a kind of geometrical filter by which codes can be processed in addition to their read code content. The association with a position in the conveying unit is in a certain manner a transformation from a coordinate system of the recorded image into a coordinate system of the conveying unit. As will be explained in the following with respect to advantageous embodiments, however, the resolution of the positions in the conveying unit here can differ, also very greatly, from those of the image, in particular only a comparatively coarse position or class of positions in the conveying unit can be determined.

The invention has the advantage that additional information on the read codes is provided. This allows refined consequent steps with a differentiated further processing. In general terms, any desired additional operations can be carried out with the read codes in dependence on their position in the conveying unit. The position is a geometrical filter by which a downstream processing step is applied specifically to only specific read codes that satisfy a property for a position in the conveying unit.

The conveying unit preferably has a plurality of partial regions separated from one another by partitions, with the control and evaluation unit being configured to associate a code with a partial region. Physical partitions are meant by this by which the conveying unit is divided into partial regions or compartments. In which partial region or compartment the object with this code is located is recognized or classified using the position of a code in the conveying unit.

The control and evaluation unit is preferably configured to distinguish two codes of the same code content with reference to their positions, in particular the associated partial regions. Codes that were previously not distinguishable are accordingly isolated with reference to their positions or their partial regions or compartments. This is an application example of a geometrical filter that makes the codes that are the same according to their code contents individually processable.

The control and evaluation unit is preferably configured for a setting up mode in which the partial regions are taught using an image of a conveying unit, in particular of an empty conveying unit, that has been recorded at a fixed position of the conveying unit with respect to the camera unit. The setting up mode, that can also be called a teaching mode, a putting into operation mode, or a calibration mode, serves to make the partial regions of the conveying unit known to the control and evaluation unit for the subsequent operation. The result of the setting up mode is accordingly an association rule that associates the matching partial region to a position in the conveying unit. The representation of this association rule is possible in different manners, whether as a function or a table, that associates a partial region or preferably a compressed representation, for example with reference to the boundaries or corners of partial regions, to every possible position in the conveying unit. The teaching and the representation are simplified with knowledge of a simple geometrical shape of the partial region, for example a rectangular shape of compartments. A conveying unit is moved into a fixed position with respect to the camera unit for the teaching, with the fixed position serving the purpose that it can be reproduced later in operation or that a correcting offset of an actual later position of the conveying unit with respect to the fixed position can be corrected.

The conveying unit is preferably moved into a fixed position by means of a mechanical stop. The fixed position is preferably the same that is used during the setting up mode, otherwise an offset can be determined and corrected. It is mechanically ensured, or at least supported, by the stop that the conveying unit is in the fixed position used in the setting up mode or is at least at a fixed offset on the reading of the code. The code reading device design particularly preferably permits only one position for a conveying unit; at least is made substantially simpler for the user by the mechanical stop to adopt the fixed position with the conveying unit. The stop can be designed as desired as long as a position is at least partially fixed thereby, for example as an angle or anther partial contour or as a recess having at least one partial contour corresponding to the conveying unit. As an alternative to requiring a fixed position of the conveying unit in operation, the actually adopted position of the conveying unit can be determined from the recorded image and a corresponding offset from the fixed position from the setting up mode can be corrected.

The control and evaluation unit is preferably configured to teach the partial regions in that edges of separators of the partial regions are recognized in the image of the conveying unit, with edges in particular being associated with a partial region with reference to a known shape of the partial regions. Classical methods of image processing known per se are thus used to recognize edges and these edges are then assembled to form the partial regions. The edges correspond to the margin of the conveying unit and the physical partitions or dividing webs between the partial regions. The localizing of these edges is simplified if an empty conveying unit is recorded because there are then no additional edges of objects or codes. Alternatively, relevant edges that bound partial regions and non-relevant edges of other structures can be distinguished by image processing methods. The recognition of partial regions is facilitated with an image filter such as an empty conveying unit by the condition of a known shape such as rectangular, optionally also the size of the partial regions. Errors in the image recording or edge recognition, a result of which gaps can remain in the edges or image interference is erroneously recognized as parts of edges, can thereby also be compensated.

The control and evaluation unit is preferably configured to associate a code with a partial region with the aid of a process of machine learning. The process of machine learning is called a neural network as representative in the following without thereby excluding other processes of machine learning. It is preferably a deep neural network or a convolutional neural network (CNN). It is conceivable in principle to carry out the association of a read code with a partial region using both classical image processing and a process of machine learning and, for example, to compare, to plausibilize, or to average the results.

The control and evaluation unit is preferably configured to train the process of machine learning by means of supervised learning, with images of conveying units with codes and a known association with a respective partial region being repeatedly presented to the process of machine learning. There is accordingly a set of training images with the conveying unit and the codes at different positions for which it is known which partial region should be associated with the codes. This specification (annotation, labeling) is generated manually or by another image processing system. Depending on the training step, the process of machine learning then makes a classification statement on the partial region it associates a respective code with. It receives an error signal depending on the deviation from the correct association known in advance for the training image and learns from this error, for example in a neural network, by adaptation of weightings by means of back propagation. It is conceivable that a neural network does not only associate read codes with a partial region, but also reads the codes themselves. For this purpose, however, the training images additionally have to be annotated with the code content and a very large training dataset is required due to the large variety of possible code types, code sizes, code positions, and code content. The pure association with partial regions is already performed by a smaller neural network with comparatively few training images. A possibility of dealing with the complexity and nevertheless expanding the application area for a process of machine learning comprises spreading the work over a plurality of neural networks. For example, one neural network performs a pre-segmentation, a further neural network reads codes from the resulting image portions, while a third neural network locates the association with a partial region. There are namely already neural networks for partial work such as the segmentation or the reading or codes or corresponding training datasets.

The code reading device preferably has a plurality of camera heads, with the control and evaluation unit being configured to assemble the image data of the camera heads into one common image and/or to read the codes in the respective image data and to compare them with one another. The plurality of camera heads serve to record a larger image and/or an image of higher resolution. The individual images of the camera heads can be merged into one image than is then treated as the image of only one single camera head or respective codes are read in the individual images, with the evaluation of the image also being able to be parallelized. The overlap of the fields of view of the camera heads is preferably larger than a code for then every code in an image region of the same camera can be read and no transition regions have to be considered (stitching).

The camera unit preferably has a changeable lighting unit, in particular having a plurality of illumination modules, with the control and evaluation unit being configured to record the objects multiple times under different lighting for the parallel reading of the codes, in particular under lighting from different directions. The lighting unit is able to generate different illumination scenarios under which, where possible, different codes or more codes can be read. The intensity of illumination and/or the direction of the lighting is/are in particular varied for this purpose. A preferred embodiment provides positioning a respective one illumination module to the right and left of the camera and to produce three shots when illuminating from a respective one side or from both sides. Disadvantageous effects due to inherent glare and underdrive and overdrive are thus compensated. The plurality of images are first merged, depending on the embodiment, into an image of better quality, similar to an HDR (high dynamic range) shot, or the control and evaluation unit reads codes one after the other from a plurality of images or from each image.

In a preferred further development, a system is provided having a code reading device in accordance with the invention and having at least one conveying unit that in particular has a plurality of partial regions separated from one another by partitions. There are preferably a large number of conveying units that are the same in the sense that they have the same dimensions and partitions and each of them is presented to the code reader in the field of view of the camera unit. Differing from this, there can be a plurality of types of conveying units that only have the same dimensions and partitions within a type. The code reading device then recognizes the type and treats the conveying unit with this pre-processing step as only a single family of similar conveying units.

The system preferably has a framework having a support on which the conveying unit is placed, with the camera unit being arranged stationary on the framework. A compact total unit with defined spatial relationships is thereby produced. A conveying unit having respective codes to be read is placed on the support. As already explained multiple times, it is a presentation application in which the conveying unit for the code reading is still; it is not recorded during a conveying movement as in many other code reading applications. The camera unit is mounted on the framework and thus adopts a fixed position and preferably also orientation with respect to the support and thus to the conveying unit.

The support preferably has a mechanical stop to give the conveying unit a fixed position with respect to the camera unit. Reference is made to the corresponding explanations above in connection with the code reading device for the function and possible embodiments of the mechanical stop and conceivable alternatives.

The method in accordance with the invention can be further developed in a similar manner and shows similar advantages in so doing. Such advantageous features are described in an exemplary, but not exclusive manner in the subordinate claims dependent on the independent claims.

BRIEF DESCRIPTION OF THE DRAWINGS

The invention will be explained in more detail in the following also with respect to further features and advantages by way of example with reference to embodiments and to the enclosed drawing. The Figures of the drawing show in.

DETAILED DESCRIPTION

Figure 1:
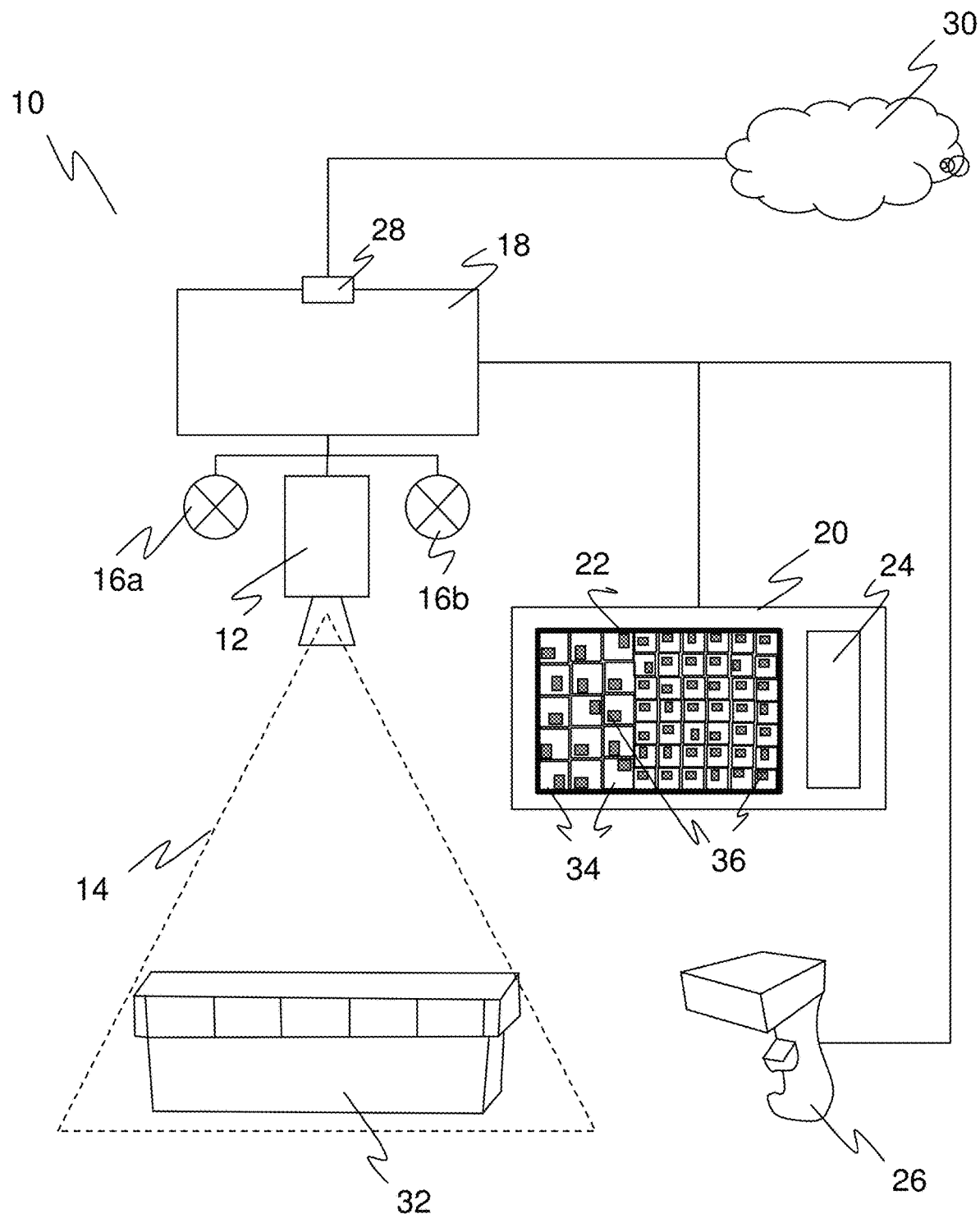
FIG. 1 a schematic overview representation of a code reading device with a camera unit for a parallel reading of codes.

FIG. 1 shows an overview representation of a code reading device 10. It is formed as a complete system that provides a camera based parallel reading process to read a plurality of codes. The code reading device 10 has a camera unit 12 whose camera head is only shown symbolically in FIG. 1. The camera unit 12 comprises, without any separate illustration, a preferably high resolution image sensor, a suitable optics, and an interface to at least output the respective recorded image data. If the field of view 14 of a single camera head is not sufficient, a plurality of camera heads can be arranged next to one another. A lighting unit that is equipped with two illumination modules 16a-b. at both sides in FIG. 1 is associated with the camera unit 12 The illumination modules 16a-b are preferably particularly fast with correspondingly powerful LEDs or laser diodes.

A control and evaluation unit 18 makes use of the image data of the camera unit 12, evaluates them, and controls the illumination modules 16a-b during the recordings. The control and evaluation unit 18 has at least one digital processing module such as at least one microprocessor, at least one FPGA (field programmable gate array), at least one DSP (digital signal processor), at least one ASIC (application specific integrated circuit), at least one VPU (video processing unit), or at least one neural processor. Images of the camera unit 12 and evaluation results can be presented on a display 20. The display 20 is preferably configured as a touchscreen and then simultaneously serves as a control unit of the code reading device 10. A first region 22 for presenting images and a second region 24 for control elements are, for example, provided on the display 20.

A supplementary hand held scanner 26 is optionally connected to the control and evaluation unit 18 in a wireless or wired manner. The control and evaluation unit 18 can communicate via an interface 28 with a superior system, for example a superior controller, a connected network, an edge device, or, as shown, a cloud 30. The control and evaluation unit 18 can be implemented, differently to what is shown, at least partially externally in the superior system. The interface 28 can be configured according to every known standard, for example wired or wireless, for example by WiFi or cellular radio.

A conveying unit is arranged in the field of view 14 of the camera unit 12, called a box 32 as representative in the following, in which a plurality of objects 34 with optical codes 36 applied thereto are located. This can only be recognized on the display 20 due to the perspective in FIG. 1. To read the codes 36 in the box 32, an image of the box with the objects 34 located therein and the codes 36 is recorded by the camera unit 12 as is shown by way of example in the first region 22 of the display 20. The perspective of the camera unit 12, here in the plan view, and the orientation of the objects 34 in the box 32 are preferably coordinated with one another so that all the codes 36 are visible in the image.

The control and evaluation unit 18 locates the code regions with the codes 36 by means of image evaluation processes and reads their code content. All one-dimensional and two-dimensional code standards are conceivable here. The camera based reading of optical codes is known per se and will not be described in any more detail here. In the case of a plurality of camera heads, every camera head records its part section of the field of view 14. These image data are then merged and the codes 36 are read in the common image. Alternatively, codes 36 are read from the individual images and the data are then only collected at the level of read code information.

A plurality of recordings are produced in preferred embodiments. It is again alternatively conceivable to subsequently first merge the image data to obtain a higher quality image and to read the codes 36 therein or already to read codes 36 in the respective images to thus ultimately carry out a plurality of attempts on different image data for every code 36. An example for the detection of higher quality image data by multiple recording is HDR (high dynamic range).

Such multiple recordings are preferably produced in different illumination scenarios in that different illumination modules 16a-b are activated and/or their illumination intensity is varied. An example is a three-stage illumination sequence with three shots for which first the left illumination module 16a, then the right illumination module 16b, and finally both illumination modules 16a-b are switched on. Reading errors due to interfering reflections are thereby minimized. The number of illumination modules 16a-b and thus the number of possible illumination scenarios and the order in the illumination sequence is not fixed. The illumination scenarios and multiple recordings can rather be parameterized with respect to the application.

All the codes 36 are only read in the ideal case due to the parallel reading process based on the image data of the camera unit 12. To achieve an even higher reading rate, following this the previously unreadable codes 36 are subsequently read by the optional hand held scanner 26. The operator is here assisted by the display 20 on which, for example, the already read codes 36 or the locations of regions recognized as an object 34 or a code 36 are marked in which subsequent reading has to take place. In addition, the number of read codes 36 and, provided this number is predefined or has been determined by image evaluation, also the number of codes 36 present in total are displayed.

The code information is optionally verified via the interface 28 in a central database, that is here implemented in the cloud by way of example, and is also logged out on transfer to the end customer. The database, in particular a pharmaceutical or tobacco product verification platform, is operated by a provider as a rule. The control and evaluation unit 18 provides all the steps of communication required on the part of the code reading device 10. The database and the specific embodiment of the communication with the database are not the subject of the invention and are known per se. This is explained, for example, in DE 20 2019 104 044 U2, with WO 2019/149908 A1 describing possibilities of safeguarding by encryption and blockchain.

Figure 2:
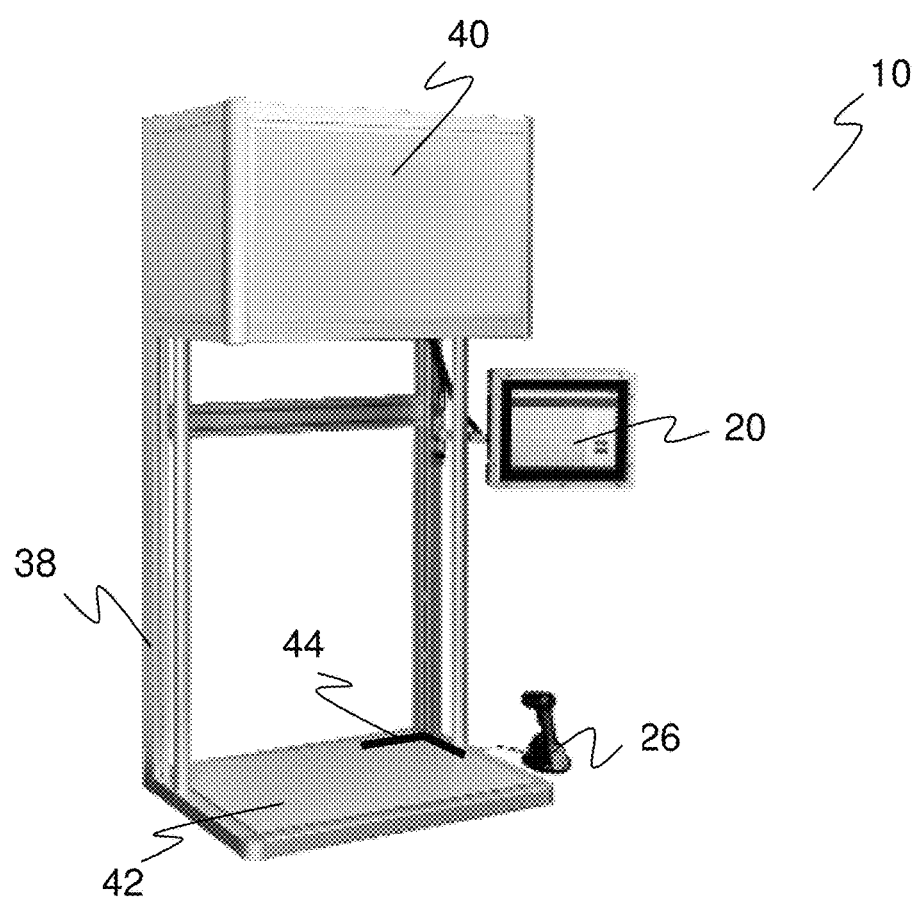
FIG. 2 a further three-dimensional view of a possible mechanical embodiment of the code reading device.

FIG. 2 shows a further three-dimensional view of a possible mechanical embodiment of the code reading device 10. A framework 38 mechanically connects the different elements of the code reading device 10 to one another so that the complete system also physically forms a unit. The camera unit 12 accommodated behind a cover 40 and the illumination modules 16a-b here are fastened to the framework 38 such that the box 32 is recorded within the depth of field region when it is placed on a support 42 provided at the framework 38. The control and evaluation unit 18 can be hidden in the framework 38 and it is accessed via the display 20 designed as a touchscreen and/or via alternative control elements that are each attached to the framework 38 in an easily accessible manner. At least one placement station for the optional hand held scanner 26 that also charges a wireless device is preferably provided at the framework 38 or the hand held scanner 26 can be connected by a connection line or by a holder cord that prevents the hand held scanner 26 from being removed from the code reading device 10.

A mechanical stop 44 that moves a box 32 placed on the support 52 into a well-defined position and orientation is furthermore located on the framework 38 or a support 42. The mechanical stop 44 is shown as a bracket, but is not restricted thereto. The mechanical stop 44 can in particular have a different contour, at least one side wall, and/or a suitable recess for the box 32. A print is also conceivable that intuitively communicates the intended positioning to the user.

In some code reading applications, the read codes 38 should be associated with a position within the box 32. The box 32 can in particular be divided virtually or physically into subcontainers or partial regions with which the read codes 36 are associated. This produces a kind of geometrical filters that make it possible to directly further process codes 36 according to their positions or their partial regions. Individualized contact lens packaging in individual compartments of a box 32 are an example, with the compartments assigning every contact lens package a unique storage position that is also known in the further processing due to the association.

Figure 3:
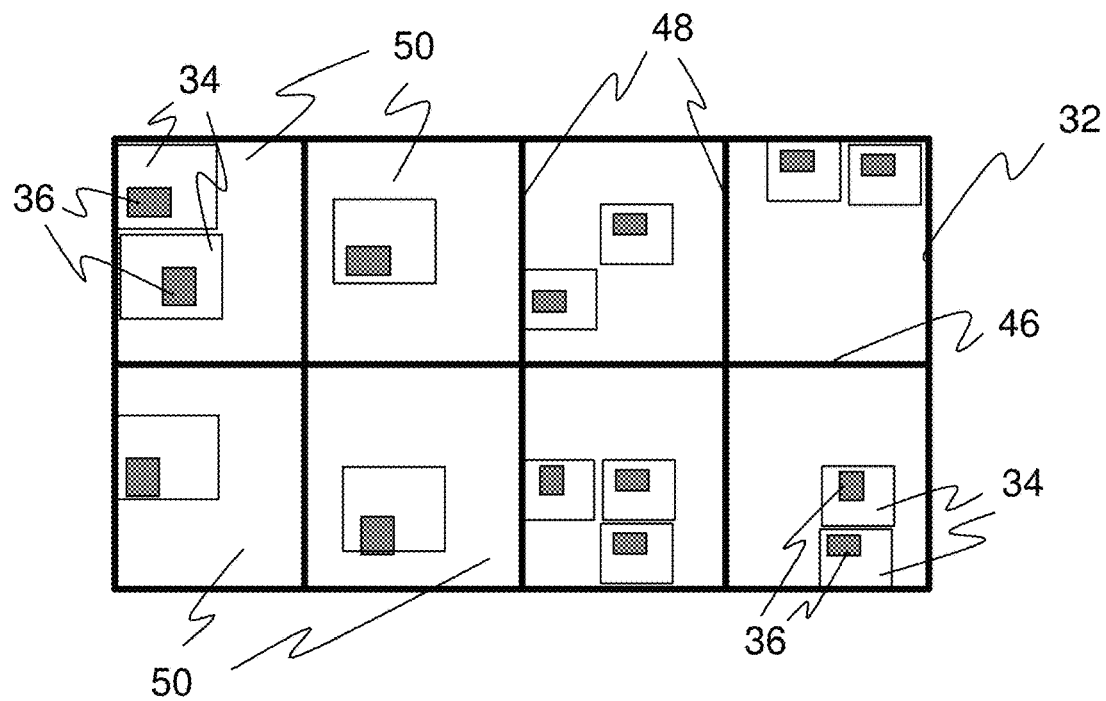
FIG. 3 a schematic plan view of a plurality of objects with codes in a conveying unit.

FIG. 3 shows a schematic plan view of a plurality of objects 34 with codes 36 in a box 32 for the further explanation of this concept. The box 32 is divided by at least one horizontal partition 46 and/or at least one vertical partition 48 into a plurality of partial regions. The partitions 46, 48 may be only virtual; they are preferably physical partitions 46, 48 so that compartments 50 have been produced as partial regions in the box 32.

The control and evaluation unit 18 should now not only read the codes 36, but also associate the codes 36 or the associated objects 34 with the correct compartment 50. The respective coordinates of the code 36 within the recorded image are first determined for this purpose. The code regions anyway have to be localized for the decoding, their position in the image is thus known.

However, this is only the position in the image and not yet the position in the box 32. The position of the box 42 in the image and the position of a respective code 36 with respect to the position of the box 32 are therefore additionally determined. It is conceivable to determine the position of the box 32 by image processing in each case. The box 32 is, however, preferably respectively moved into a well-defined position that is, for example, fixed by the mechanical stop 44. The positions of the codes 36 in the image can thus be converted in one or the other manner into positions of the codes in the box 32. The latter positions are now used for a classification by which a code 36 is associated with a compartment 50.

The location of the compartments 50 has to be known for this classification so that the positions of the codes 36 can be compared therewith. It is conceivable for this purpose to locate the partitions 46, 48 and thus the compartments 50 in each case by means of image processing in a recorded image. However, a calibration of the compartments 50 preferably takes place prior to the actual operation in a setting up of the code reading device 10. In this respect, a box 32 of the type later used in operation is moved into the position defined by the mechanical stop 44 and is recorded. The partitions 46, 48, and thus the compartments, are localized by means of image processing, in particular edge detection, and their respective positions are stored for the later operation.

Alternatively to classical image processing, processes of machine learning, in particular a neural network, can be used for the association of a code 36 with a compartment. The process of machine learning is taught the desired classification in a previous training using example images with a known association of codes 36 with compartments 50.

After an association of codes 36 with compartments 50 has taken place, both the code content and the compartment 50 in which the respective code 36 and thus the object 34 bearing the code 36 are located are thus known for the codes 36 in a box 32. The additional information of the compartment 50 can be understood as a kind of geometrical filter that now permits different differentiated processing steps. For example, codes 36 of the same content can nevertheless be individualized and thus successfully processed using a different compartment 50.

Figure 4:
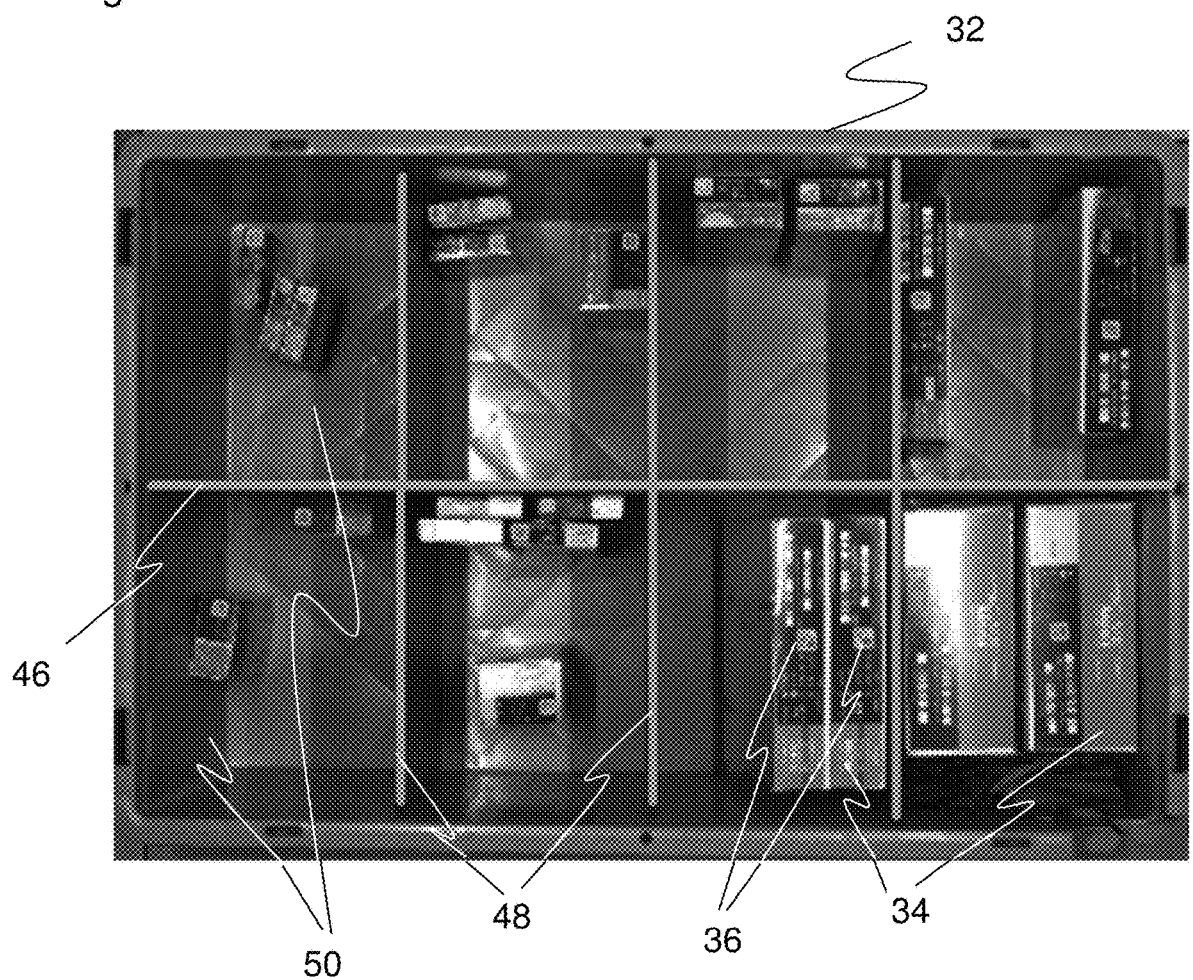
FIG. 4 an exemplary camera image corresponding to the schematic plan view of FIG. 3.

FIG. 4 finally shows an exemplary camera image corresponding to the schematic plan view of FIG. 3.

The invention claimed is:

1. A code reading device for the parallel reading of a plurality of codes on a plurality of objects in a conveying unit,
   wherein the code reading device has a camera unit having at least one camera head for recording an image of the objects with the codes and a control and evaluation unit that is configured to localize code regions of the codes in the image and to read the code information of the codes and to determine the position of a respective code in the image,
   wherein the control and evaluation unit is further configured to associate the position of a code in the image with a position in the conveying unit,
   wherein the conveying unit has a plurality of partial regions separated from one another by partitions,
   and wherein the control and evaluation unit is configured to associate a code with a partial region.

2. The code reading device in accordance with claim 1, wherein the control and evaluation unit is configured to distinguish two codes of the same code content with reference to their positions.

3. The code reading device in accordance with claim 2, wherein the control and evaluation unit is configured to distinguish said two codes of the same code content with reference to the associated partial regions.

4. The code reading device in accordance with claim 1, wherein the control and evaluation unit is configured for a setting up mode in which the partial regions are taught using an image of a conveying unit that has been recorded at a fixed position of the conveying unit with respect to the camera unit.

5. The code reading device in accordance with claim 4, wherein the conveying unit is an empty conveying unit.

6. The code reading device in accordance with claim 1, wherein the conveying unit is moved into a fixed position by means of a mechanical stop.

7. The code reading device in accordance with claim 1, wherein the control and evaluation unit is configured to teach the partial regions in that edges of partitions of the partial regions are recognized in the image of the conveying unit.

8. The code reading device in accordance with claim 7, wherein the edges are associated with a partial region with reference to a known shape of the partial regions.

9. The code reading device in accordance with claim 1, wherein the control and evaluation unit is configured to associate a code with a partial region with the aid of a process of machine learning.

10. The code reading device in accordance with claim 9, wherein the process of machine learning comprises a neural network.

11. The code reading device in accordance with claim 9, wherein the control and evaluation unit is configured to train the process of machine learning by means of supervised learning, with images of conveying units with codes and a known association with a respective partial region being repeatedly presented to the process of machine learning.

12. The code reading device in accordance with claim 1, that has a plurality of camera heads, wherein the control and evaluation unit is configured to assemble the image data of the camera heads into one common image and/or to read the codes in the respective image data and to compare them with one another.

13. The code reading device in accordance with claim 1, wherein the camera unit has a changeable lighting unit and wherein the control and evaluation unit is configured to record the objects multiple times under different lighting for the parallel reading of the codes.

14. The code reading device in accordance with claim 13, wherein the changeable lighting unit has a plurality of illumination modules.

15. The code reading device in accordance with claim 13, wherein the control and evaluation unit is configured to record the objects multiple times under different lighting for the parallel reading of the codes under lighting from different directions.

16. A system having a code reading device and at least one conveying unit,
   wherein the code reading device has a camera unit having at least one camera head for recording an image of the objects with the codes and a control and evaluation unit that is configured to localize code regions of the codes in the image and to read the code information of the codes and to determine the position of a respective code in the image,
   wherein the control and evaluation unit is further configured to associate the position of a code in the image with a position in the conveying unit,
   and wherein the at least one conveying unit has a plurality of partial regions separated from one another by partitions.

17. The system in accordance with claim 16, that has a framework having a support on which the conveying unit is placed, wherein the camera unit is arranged stationary on the framework.

18. The system in accordance with claim 17, wherein the support has a mechanical stop to give the conveying unit a fixed position with respect to the camera unit.

19. A method for the parallel reading of a plurality of codes on a plurality of objects in a conveying unit, comprising:
   recording an image of the objects by a camera unit having at least one camera head, code regions of the codes are localized in the image;
   the code information of the codes is read;
   determining the position of a respective code in the image,
   wherein the position of a code in the image is associated with a position in the conveying unit,
   and wherein the at least one conveying unit has a plurality of partial regions separated from one another by partitions.

20. The method of claim 19, further comprising,
   using a control and evaluation unit to train the process of machine learning by means of supervised learning, with images of conveying units with codes and a known association with a respective partial region being repeatedly presented to the process of machine learning.

* * * * *